(12) United States Patent
Hu

(10) Patent No.: US 7,556,448 B2
(45) Date of Patent: Jul. 7, 2009

(54) TURNBUCKLE AND METHOD FOR MAKING THE SAME

(76) Inventor: Bobby Hu, 16F-2, No. 367, Section 1, Gong Yi Road, Taichung (TW)

( * ) Notice: Subject to any disclaimer, the term of this patent is extended or adjusted under 35 U.S.C. 154(b) by 0 days.

(21) Appl. No.: 12/014,218

(22) Filed: Jan. 15, 2008

(65) Prior Publication Data
US 2008/0193202 A1    Aug. 14, 2008

(30) Foreign Application Priority Data
Feb. 9, 2007    (TW) .............................. 96104909 A

(51) Int. Cl.
*F16B 7/06*    (2006.01)
(52) U.S. Cl. .......................................... 403/43; 403/44
(58) Field of Classification Search ............. 403/43–48; 29/896.7
See application file for complete search history.

(56) References Cited

U.S. PATENT DOCUMENTS

| | | | | |
|---|---|---|---|---|
| 1,876,720 A | * | 9/1932 | Merrill | 403/43 |
| 1,878,055 A | * | 9/1932 | Wittliff | 403/48 |
| 2,736,581 A | * | 2/1956 | Ricks | 403/43 |
| 3,489,443 A | * | 1/1970 | Larson | 403/43 |
| 5,908,261 A | * | 6/1999 | Bush et al. | 403/43 |

* cited by examiner

*Primary Examiner*—Victor MacArthur
(74) *Attorney, Agent, or Firm*—Alan Kamrath; Kamrath & Associates PA

(57) ABSTRACT

A turnbuckle is made by a method including preparing an iron tube having a longitudinal through-hole. A diameter of each of two ends of the iron tube is reduced to form a coupling section having an engaging hole, with an interconnecting section interconnected between the coupling sections. The interconnecting section is punched in a direction perpendicular to the longitudinal through-hole to form a transverse through-hole perpendicular to the longitudinal through-hole and between the coupling sections, leaving two opposite peripheral wall portions spaced by the transverse through-hole and forming a bend extending inward from each of two end edges of each peripheral wall portion into the longitudinal through-hole. An abutting portion is formed between each bend and one of the end edges of one of the peripheral wall portions. Inner threading is formed in the engaging hole of each coupling section.

4 Claims, 12 Drawing Sheets

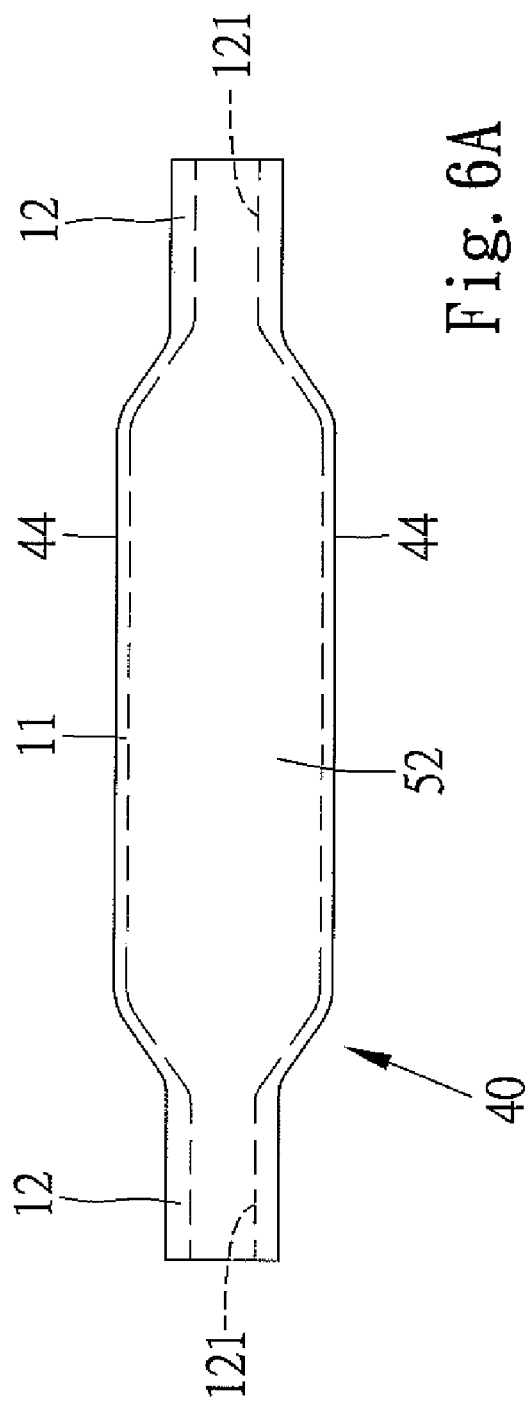
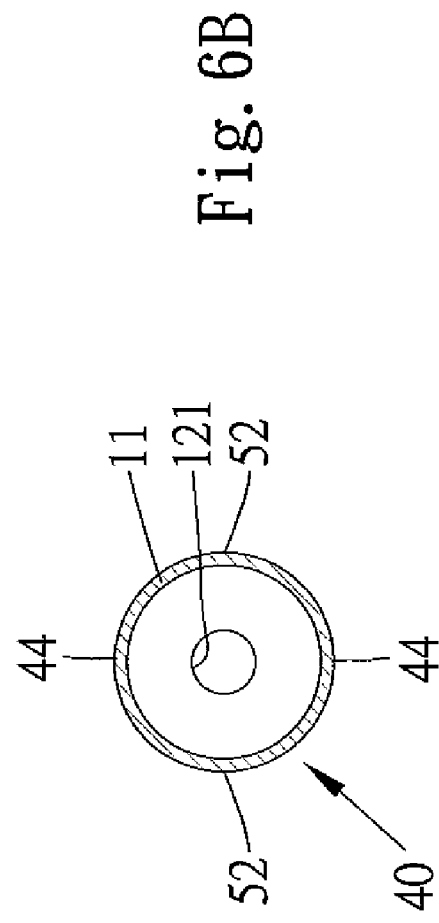
Fig. 6A
Fig. 6B

TURNBUCKLE AND METHOD FOR MAKING THE SAME

BACKGROUND OF THE INVENTION

The present invention relates to a turnbuckle and, more particularly, to a turnbuckle that can be easily manufactured at low costs and that has excellent pull-resistant and torque-resistant properties. The present invention also relates to a method for making such a turnbuckle.

FIG. 1 shows a conventional turnbuckle 1 that is generally utilized in machine industry, building industry, shipping, etc. to tighten an object such as a machine frame, a molding plate, or a rope. The turnbuckle 1 includes two coupling ends 5 and a pair of spaced interconnecting rods 2 between the coupling ends 5. A longitudinal through-hole 7 is defined between the interconnecting rods 2. Each coupling end 5 has a screw hole 6 through which a screw rod 8 extends. Formed on an outer end of each screw rod 8 is a hook 4. For tightening, a tool 3 (FIG. 2) in the form of a rod is inserted through the through-hole 7 and then turned in a direction to rotate the turnbuckle 1 and, thus, move the hooks 4 toward each other to provide the required tightening effect. However, the interconnecting rods 2 are liable to deform (FIG. 3), causing damage to the turnbuckle 1 and, thus, shortening of the life of the turnbuckle 1.

Such a turnbuckle 1 is generally formed of zinc-aluminum alloy by pressure casting that is time-consuming and expensive. In addition to weak structure with a poor extensibility, the turnbuckle 1 formed by pressure casting is solid and heavy and, thus, less desirable to users. A turnbuckle made by forging has excellent structural strength, but the costs are high.

U.S. Pat. No. 5,908,261 to Bush et al. discloses a turnbuckle and a method of making a turnbuckle. To increase the structural strength of the turnbuckle, elongate fibers are wound around fiber supports on opposite sides of the end fittings that are set in a suitable mold or die cavity. Uncured or liquid matrix material such as thermoplastic or thermoset resin is introduced over the end fittings in the cavity by injection molding or resin transfer molding processes. The matrix material is then allowed to cure or harden to solid form. Such a method is complicated, time-consuming and expensive, and, thus, not suitable for mass production.

A need exists for a method for manufacturing a turnbuckle with enhanced structural strength at low costs without sacrificing the extensibility.

BRIEF SUMMARY OF THE INVENTION

A method for making a turnbuckle according to the preferred teachings of the present invention includes preparing an iron tube having a longitudinal through-hole. A diameter of each of two ends of the iron tube is reduced to form a coupling section having an engaging hole, with an interconnecting section interconnected between the coupling sections. The interconnecting section is punched in a direction perpendicular to the longitudinal through-hole to form a transverse through-hole perpendicular to the longitudinal through-hole and between the coupling sections, leaving two peripheral wall portions on opposite sides of the transverse through-hole. After punching, a bend is formed and extends inward from each of two end edges of each peripheral wall portion into the longitudinal through-hole. Each bend delimits the transverse through-hole. An abutting portion is formed between each bend and one of the end edges of one of the peripheral wall portions. Inner threading is formed in the engaging hole of each coupling section.

Forming inner threading in the engaging hole of each coupling section can be carried out before punching the interconnecting section.

The iron tube can be trimmed after punching the interconnecting section.

A turnbuckle according to the preferred teachings of the present invention includes two coupling sections each having a screw hole. An interconnecting section is interconnected between the coupling sections and has a longitudinal hole in communication with the screw holes. The interconnecting section further includes two opposite peripheral wall portions spaced by a transverse through-hole extending perpendicularly to the longitudinal hole and between the coupling sections. Each peripheral wall portion has two opposite end edges spaced from each other in a direction parallel to the transverse through-hole. A bend extends inward from each end edge of each peripheral wall portion into the longitudinal hole. The bends are parallel to and delimit the transverse through-hole. An abutting portion is formed between each bend and one of the end edges of one of the peripheral wall portions.

In the most preferred form, each peripheral wall portion includes an intermediate section between the end edges thereof and spaced from the bends thereof. Each coupling section has an outer diameter smaller than that of the interconnecting section. The peripheral wall portions are diametrically opposed. The screw holes of the coupling sections have opposite hands.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 6A shows a side view of the iron tube of FIG. 5 after a diameter-reducing procedure.

FIG. 6B shows a cross-sectional view of the iron tube of FIG. 6A.

Figure 1:
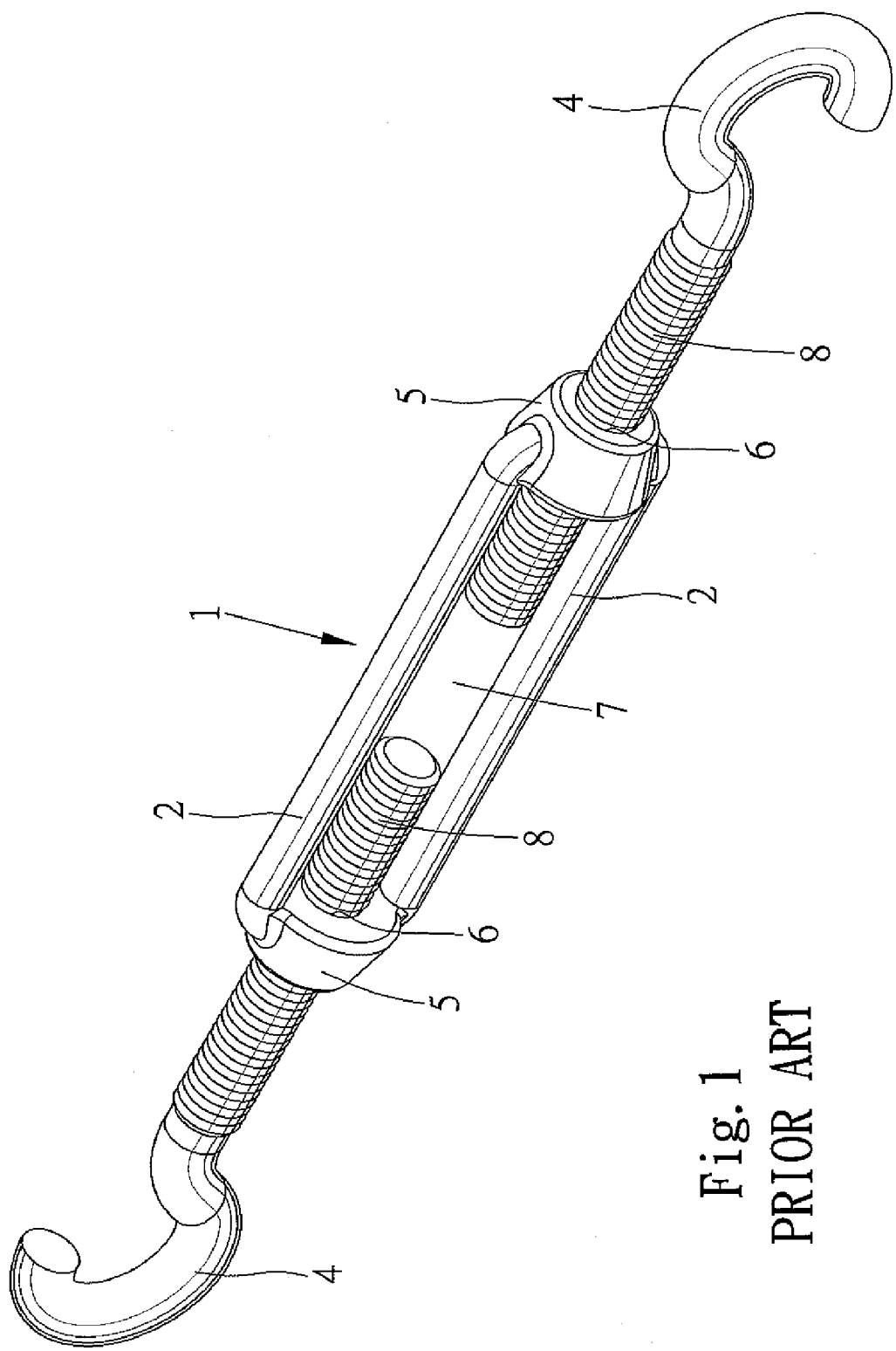
FIG. 1 shows a perspective view of a conventional turnbuckle.
Figure 2:
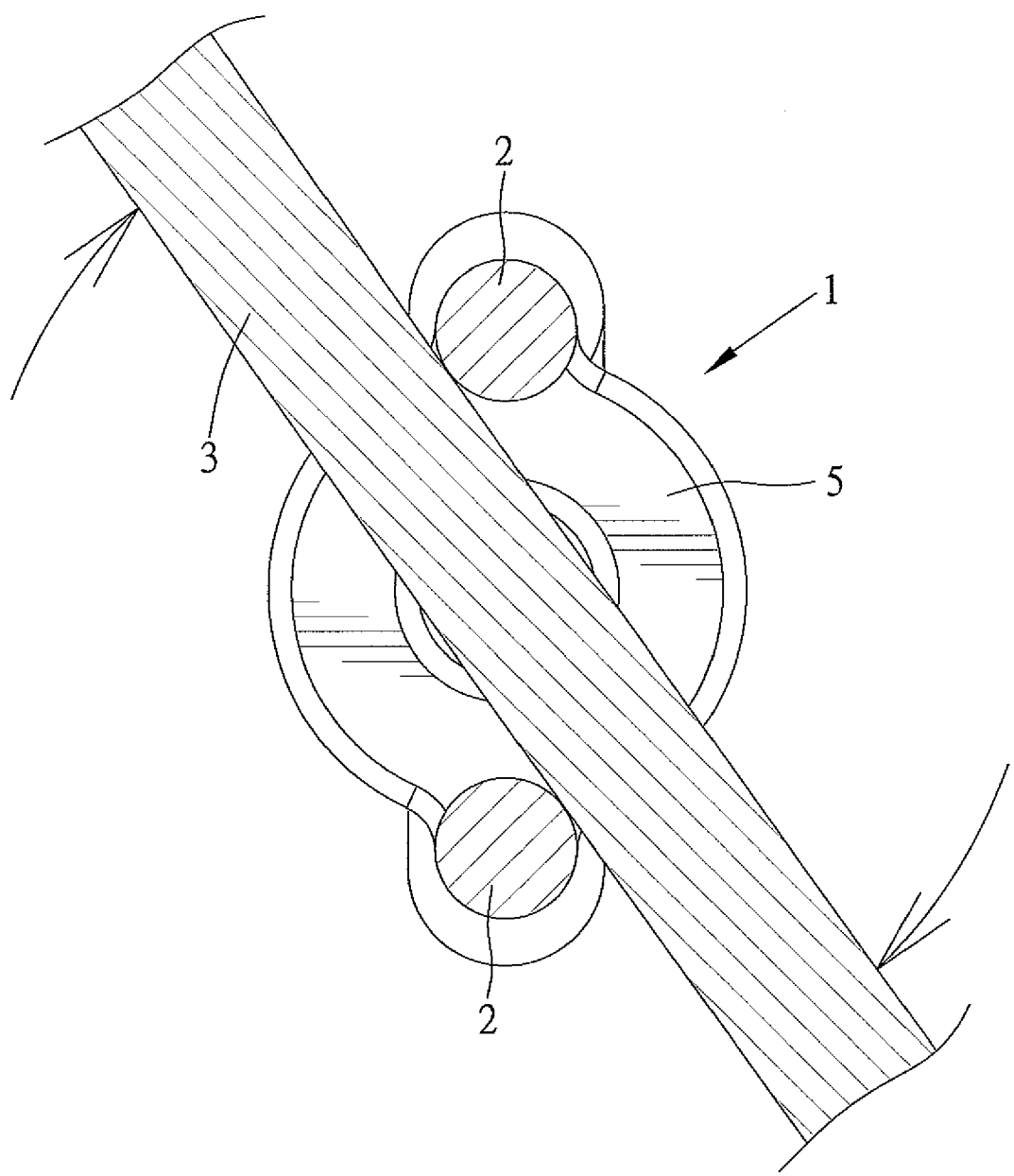
FIG. 2 is a partial, cross-sectional view of the turnbuckle of FIG. 1 and a tool for tightening operation of the turnbuckle of FIG. 1.
Figure 3:
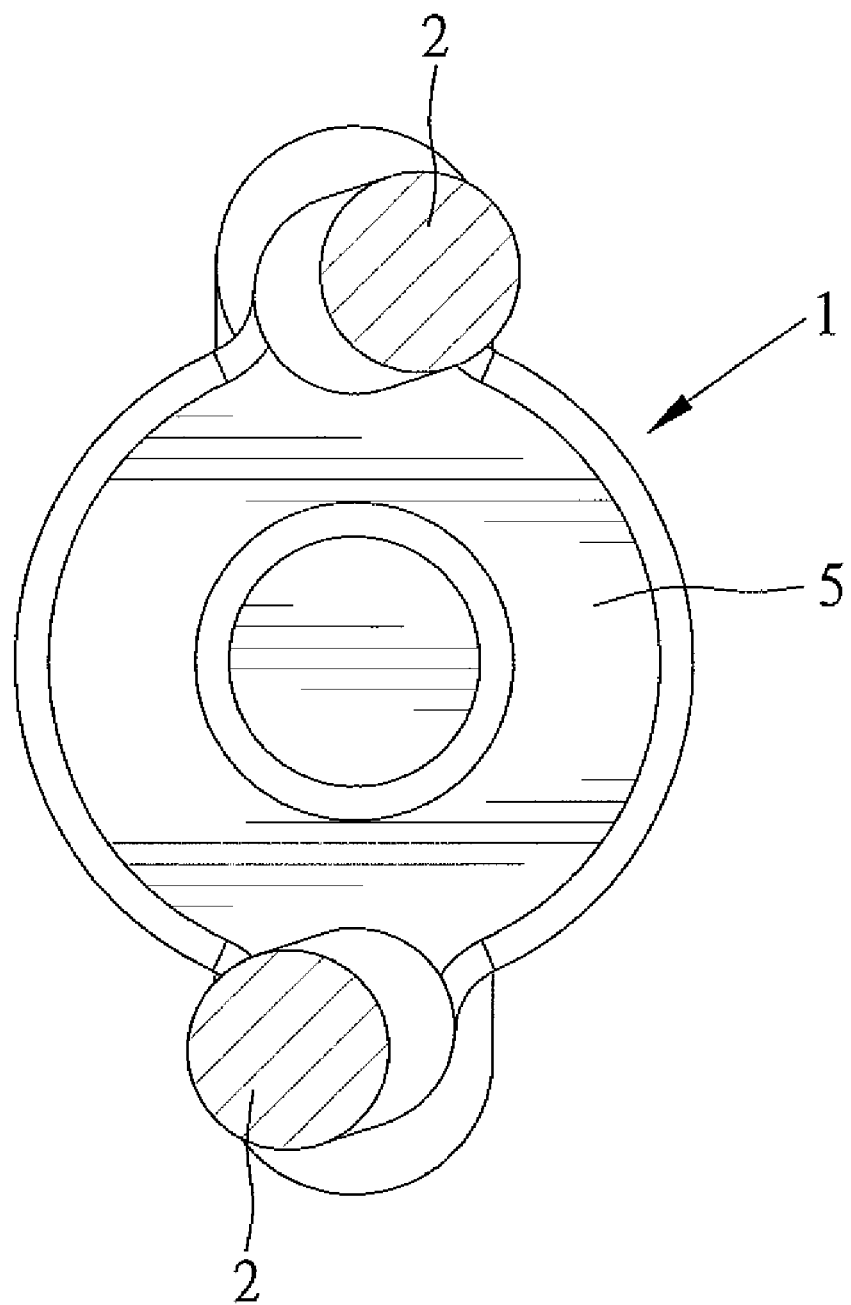
FIG. 3 shows a cross-sectional view of the turnbuckle of FIG. 2 after tightening operation.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "end", "edge", "portion", "section", "longitudinal", "transverse", "inward", "spacing", "length", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 4:
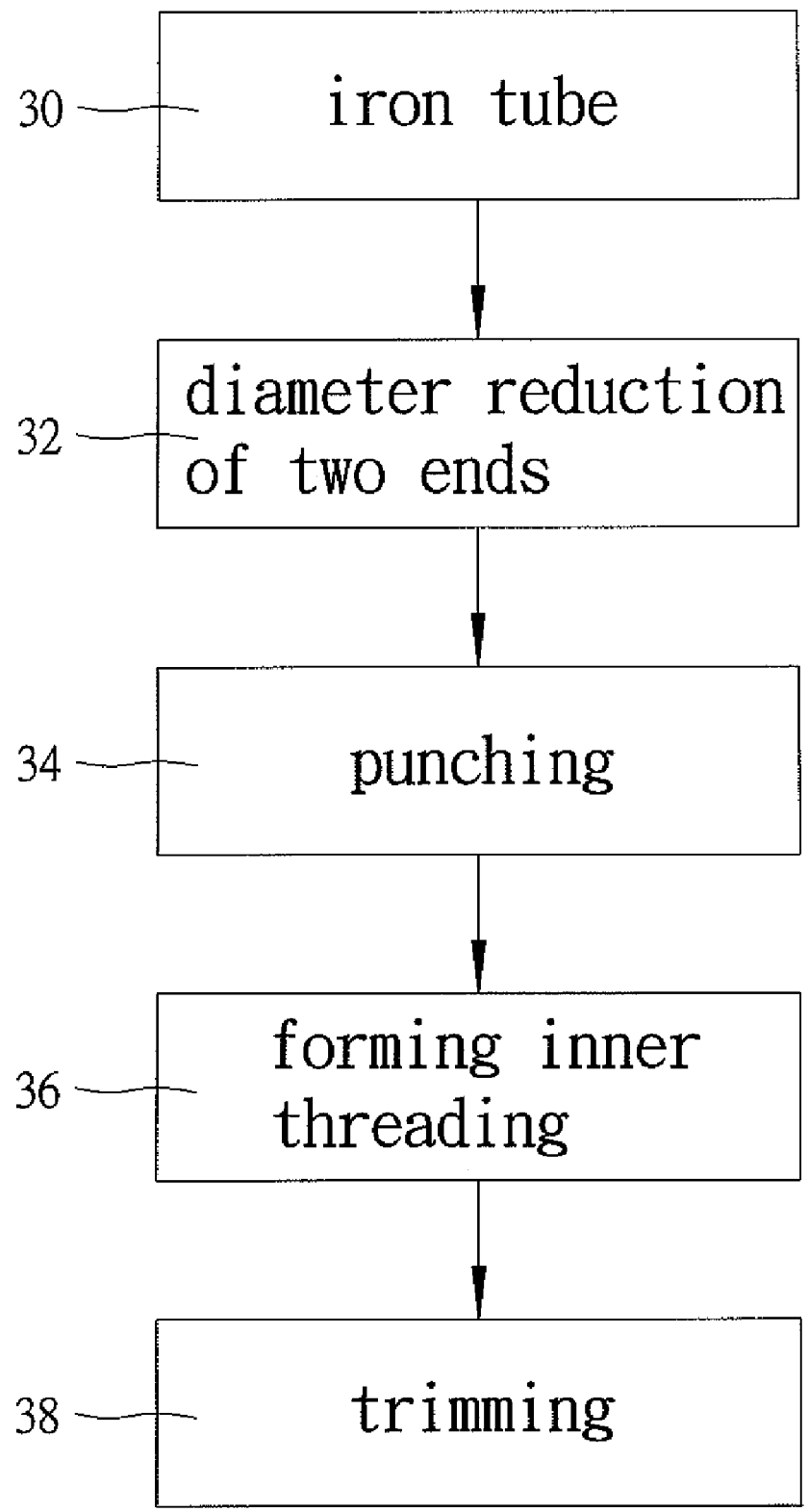
FIG. 4 shows a flowchart illustrating a method for making a turnbuckle according to the preferred teachings of the present invention.
Figure 5:
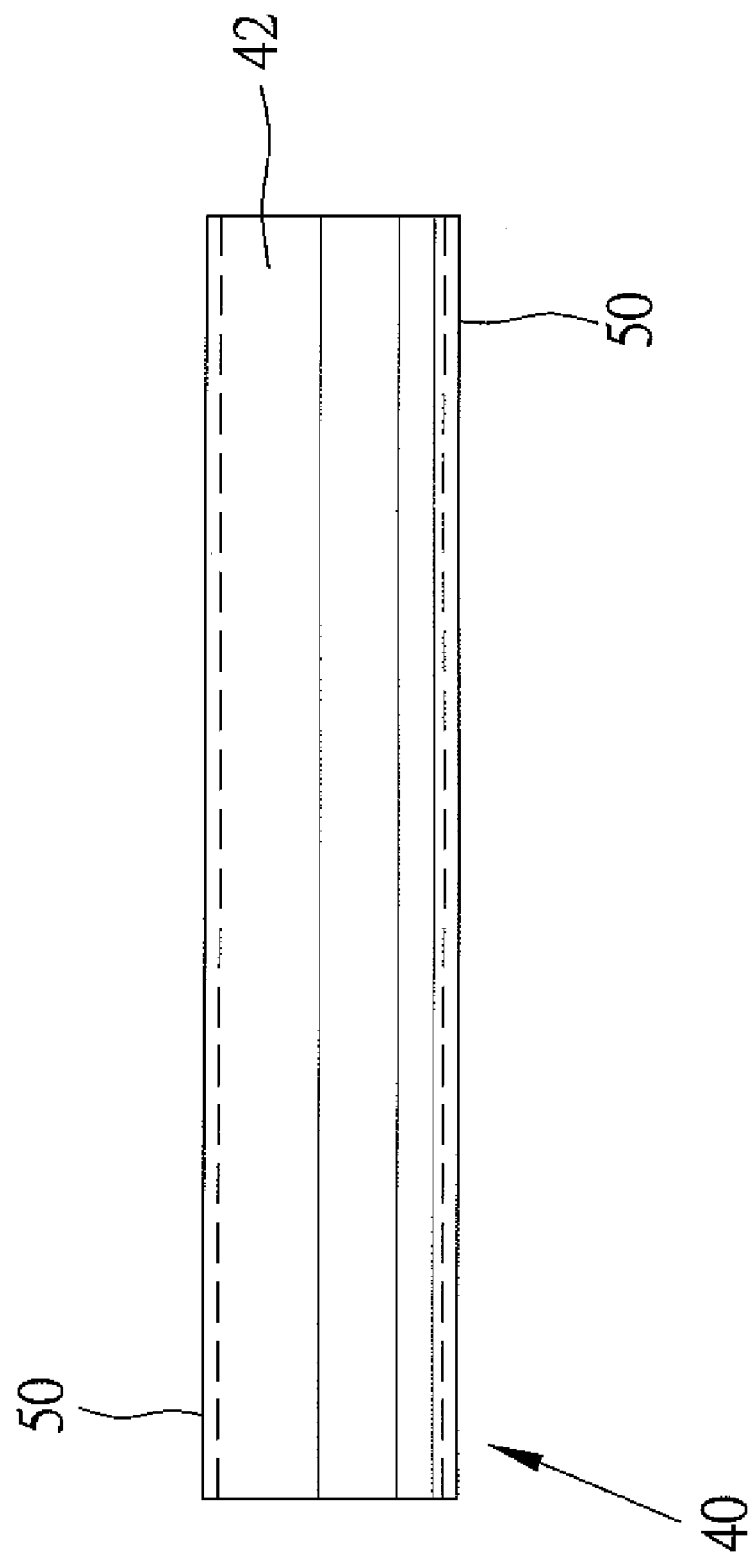
FIG. 5 shows a diagrammatic side view of an iron tube for making a turnbuckle according to the preferred teachings of the present invention.

FIG. 4 shows a flowchart illustrating a method for making a turnbuckle according to the preferred teachings of the present invention. At 30, an iron tube 40 (FIG. 5) having a longitudinal through-hole 42 and a suitable length is prepared. The iron tube 40 has circular cross-sections. At 32, each of two ends 50 of the iron tube 40 is subjected to diameter-reducing processing by a diameter-reducing machine to form a coupling section 12 having an engaging hole 121. An interconnecting section 11 is interconnected between the coupling sections 12 (FIGS. 6A and 6B). After the diameter-reduction, each coupling section 12 has an outer diameter smaller than that of the interconnecting section 11, but the wall thickness of each end 50 of the iron tube 40 is increased.

Figure 7A:
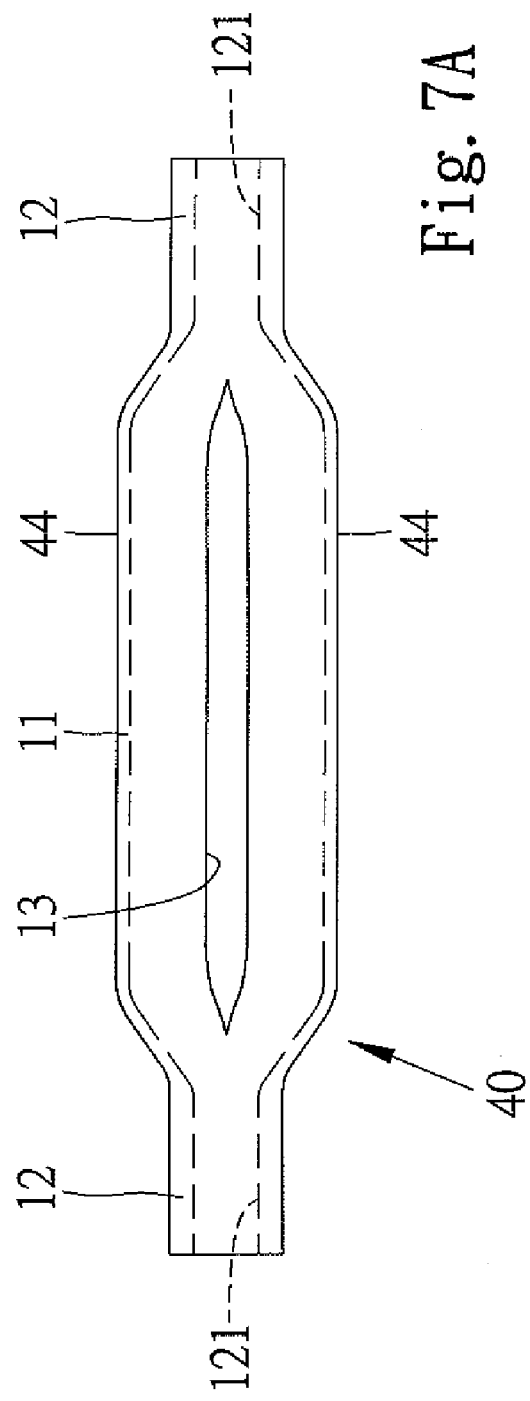
FIG. 7A shows a side view of the iron tube of FIG. 6A after a first punching stage of a punching procedure.
Figure 7B:
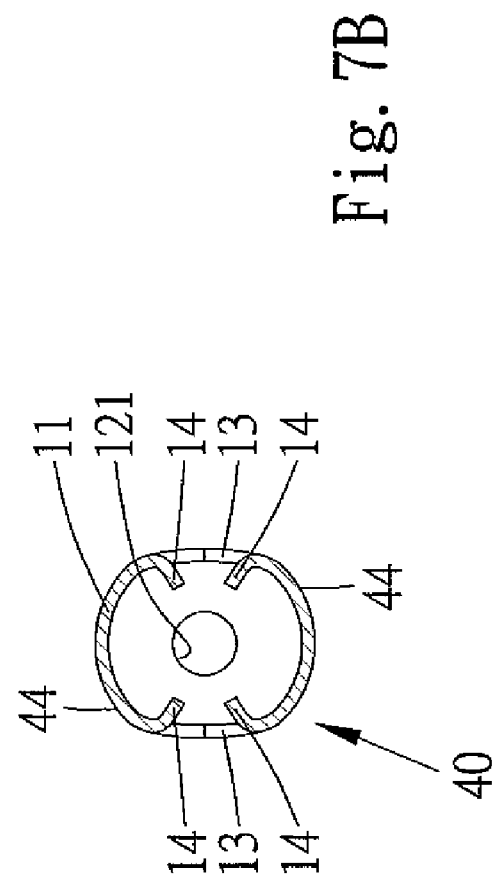
FIG. 7B shows a cross-sectional view of the iron tube of FIG. 7A.
Figure 8A:
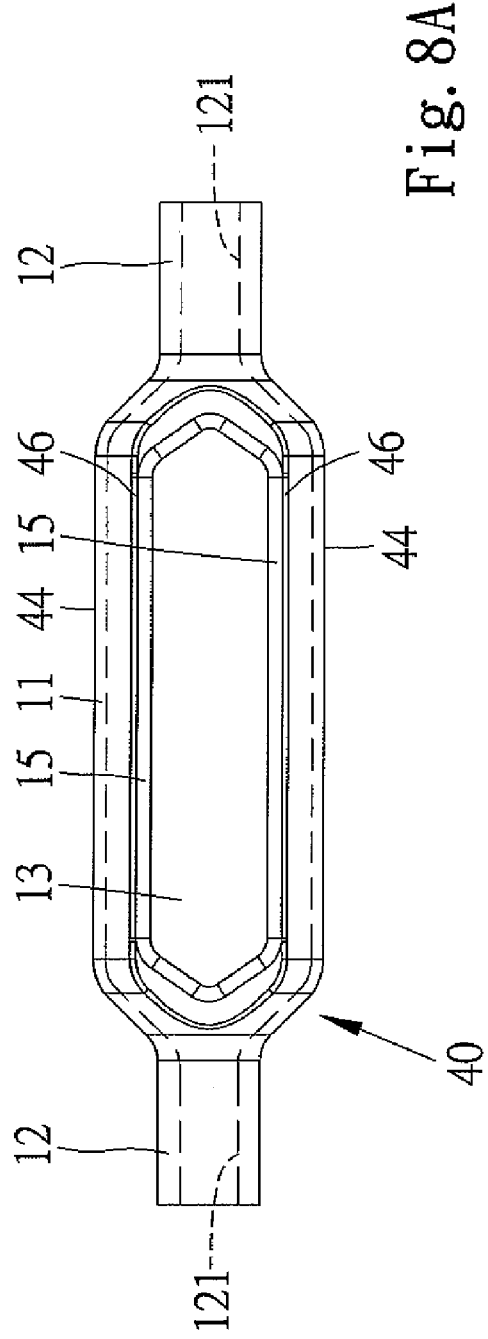
FIG. 8A shows a side view of the iron tube of FIG. 7A after a second punching stage of the punching procedure.
Figure 8B:
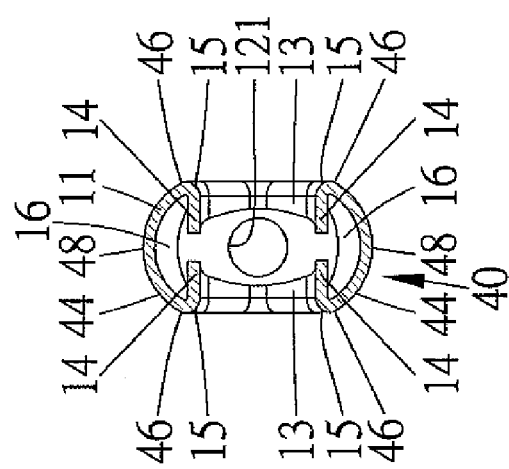
FIG. 8B shows a cross-sectional view of the iron tube of FIG. 8A.
Figure 9A:
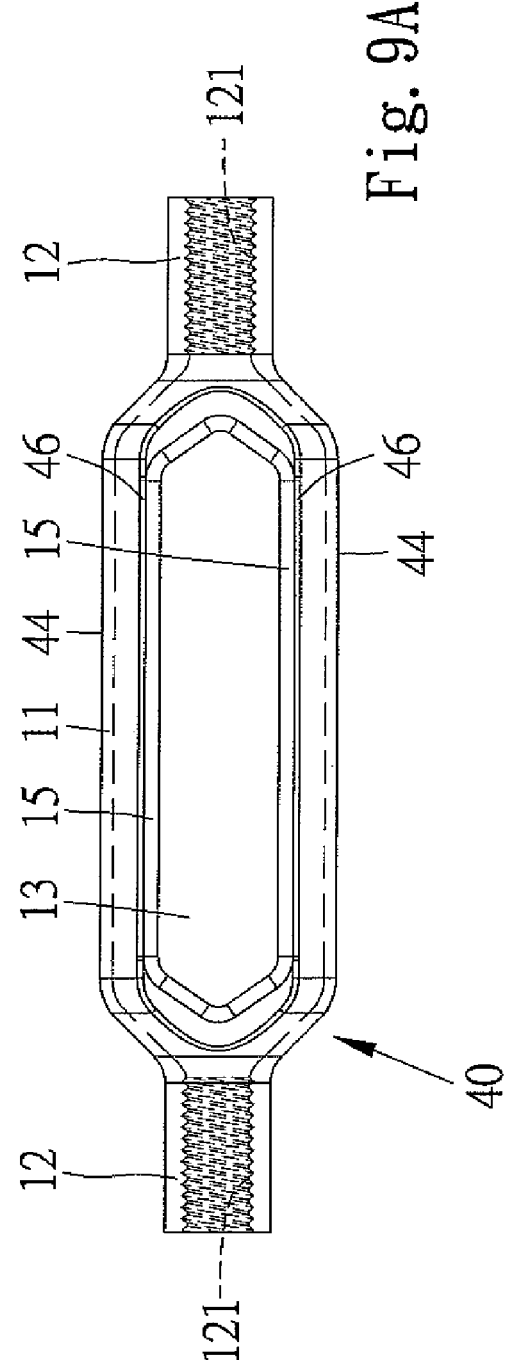
FIG. 9A shows a side view of the iron tube of FIG. 8A after formation of inner threading.
Figure 9B:
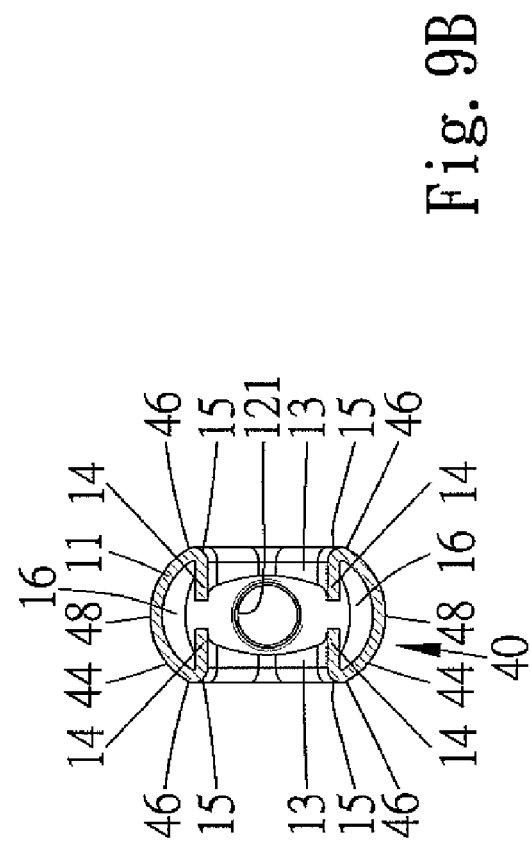
FIG. 9B shows a cross-sectional view of the iron tube of FIG. 9A.

At 34, the interconnecting section 11 is punched at two diametrically opposed peripheral wall portions 52 thereof in a direction perpendicular to the longitudinal through-hole 42 to form a transverse through-hole 13 that is perpendicular to the longitudinal through-hole 42 and between the coupling sections 12, leaving two diametrically opposed peripheral wall portions 44 spaced by the transverse through-hole 13. According to the preferred embodiment, the punching is a two-stage punching, wherein FIG. 7A shows a side view of the iron tube 40 after a first punching stage of the punching procedure, FIG. 7B shows a cross-sectional view of the iron tube 40 of FIG. 7A, FIG. 8A shows a side view of the iron tube 40 after a second punching stage of the punching procedure, and FIG. 8B shows a cross-sectional view of the iron tube 40 of FIG. 8A. As can be seen from FIGS. 8A and 8B, after punching, a bend 14 is formed and extends inward from each of two end edges 46 of each peripheral wall portion 44. Each bend 14 is parallel to and delimits the transverse through-hole 13. An abutting portion 15 is formed between each bend 14 and one of the end edges 46 of one of the peripheral wall portions 44. Furthermore, an intermediate section 48 between the end edges 46 of each peripheral wall portion 44 is spaced from the bends 14 extending from the end edges 46 by a spacing 16 in a direction perpendicular to the longitudinal through-hole 42 and the transverse through-hole 13.

At 36, inner threading is formed in the engaging hole 121 of each coupling section 12 to form a screw hole. Suitable methods including but not limited machine tapping can be utilized to form inner threading in the engaging holes 121. According to the preferred form shown, one of the engaging holes 121 is a left-hand screw hole and the other engaging hole 121 is a right-hand screw hole. It can be appreciated that the wall thickness of each end 50 of the iron tube is increased through the diameter-reducing processing to allow formation of the inner threading without damaging the structural strength of the coupling sections 12.

Figure 10:
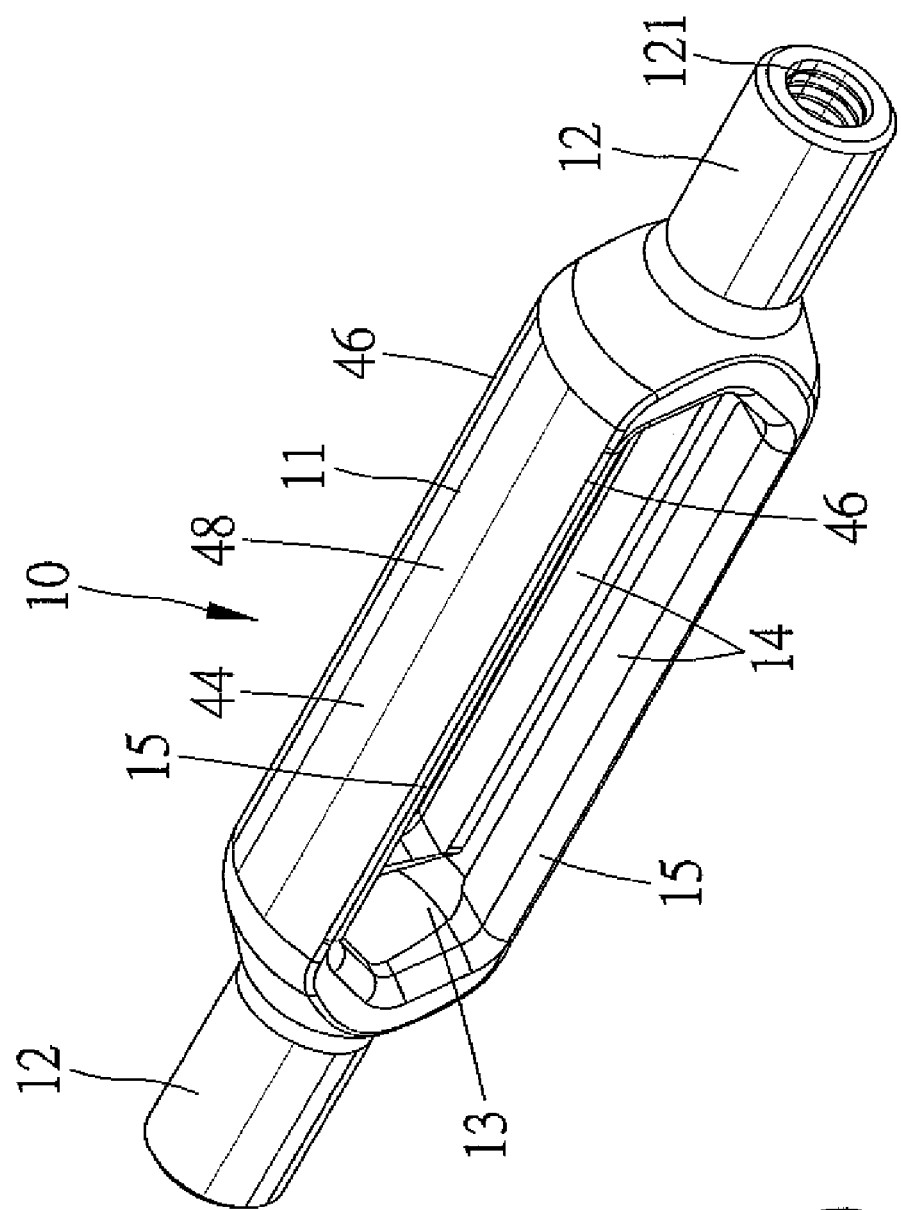
FIG. 10 shows a final product of a turnbuckle according to the preferred teachings of the present invention.

At 38, the iron tube 40 is trimmed to form a product of a turnbuckle 10 (FIG. 10).

Figure 11:
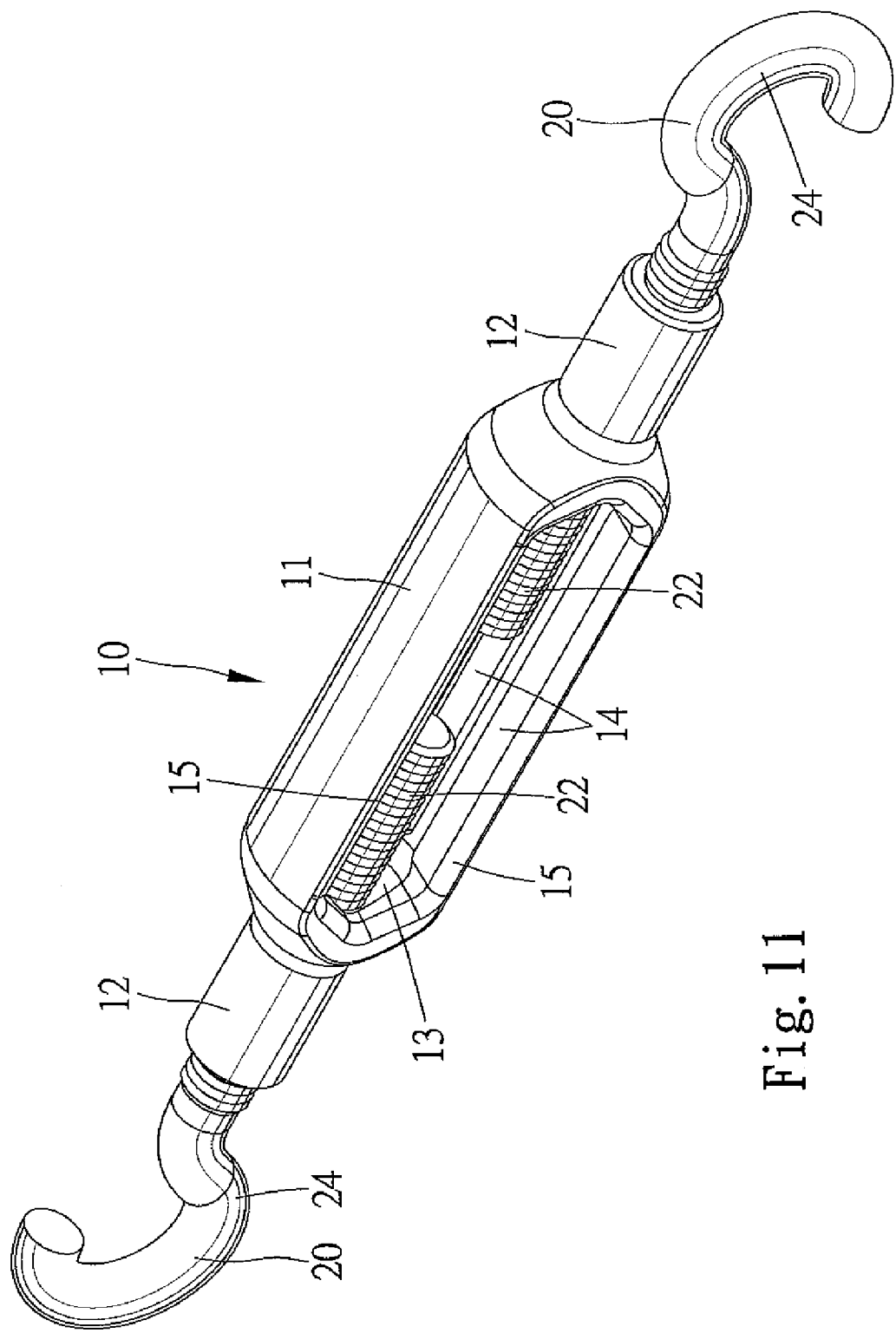
FIG. 11 shows a perspective view of the turnbuckle of FIG. 10 with two coupling rods coupled with the turnbuckle.
Figure 12:
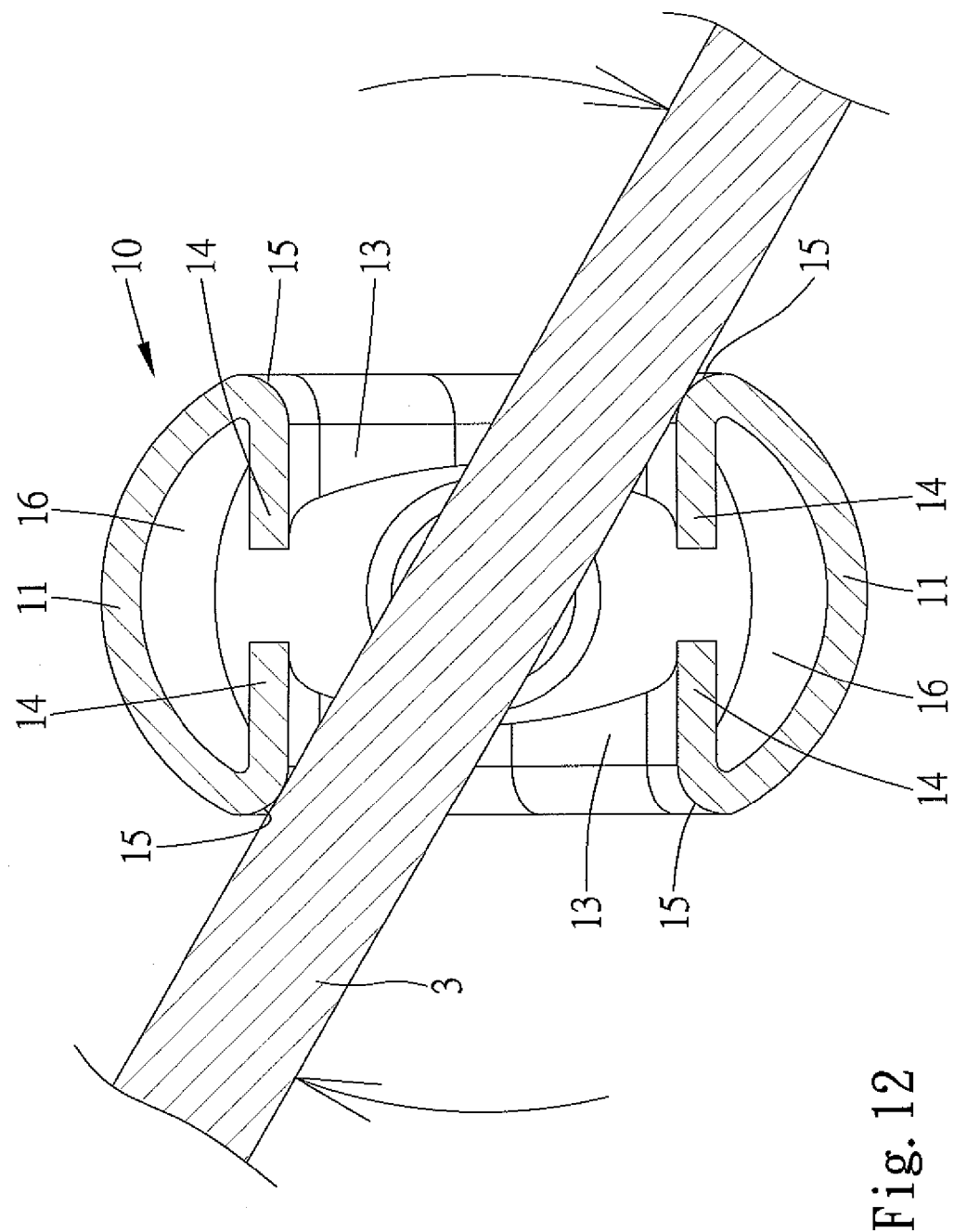
FIG. 12 shows a partial, cross-sectional view of the turnbuckle of FIG. 11 and a tool for tightening operation of the turnbuckle of FIG. 11.

With reference to FIGS. 11 and 12, two coupling rods 20 are respectively coupled with the coupling sections 12 of the turnbuckle 10. Each coupling rod 20 includes a hook 24 outside the turnbuckle 10 and a screw rod 22 threadedly engaged with the engaging hole 121 of one of the coupling sections 12. A tool 3 in the form of a rod is inserted through the transverse through-hole 13 and turned in a direction to rotate the turnbuckle 10 and, thus, move the hooks 24 toward each other for providing the required tightening effect. The tool 3 can be turned in a reverse direction to move the hooks 24 away from each other for loosening purposes. It can be appreciated that the abutting portions 15 of the turnbuckle 10 according to the preferred teachings of the present invention formed during simple, fast punching can withstand higher torque than a turnbuckle made by casting.

It can be appreciated that the turnbuckle 10 according to the preferred teachings of the present invention is made of a single, round iron tube that is light and cheap. Thus, the turnbuckle 10 according to the preferred teachings of the present invention can be made at low costs and has excellent structural strength and excellent pull-resistant properties compared to the conventional iron tube made by casting. Specifically, the turnbuckle 10 according to the preferred teachings of the present invention is a single continuous monolithic piece and, thus, has excellent structural strength, for the coupling sections 12 and the interconnecting section 11 are integral with each other. Furthermore, the turnbuckle 10 made by the method the according to the preferred teachings of the present invention is cheaper and faster than forging and casting, for less material and simple procedures are utilized. Thus, the turnbuckle 10 according to the preferred teachings of the present invention is lighter than those made by forging and casting and, thus, allow easy operation by a user. The abutting portions 15 of the turnbuckle 10 according to the preferred teachings of the present invention formed during simple, fast punching has better extensibility and can withstand higher torque than a turnbuckle made by casting. The two-stage punching procedure can be replaced with a single-stage punching or other punching procedures.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A turnbuckle comprising:
   two coupling sections each having a screw hole; and
   an interconnecting section interconnected between the two coupling sections and having a longitudinal hole in longitudinally aligned communication with the screw holes, with the interconnecting section further including a transverse through-hole extending perpendicular to the longitudinal hole and between the coupling sections, with the interconnecting section further including two opposite peripheral wall portions spaced by the transverse hole, with each of the two peripheral wall portions having two opposite end edges spaced from each other in a direction parallel to the transverse through-hole, with a bend extending inward from each of the two end edges of each of the two peripheral wall portions into the longitudinal hole and parallel to and delimiting the transverse through-hole, with an abutting portion being formed between each bend and a respective one of the end edges, each of the two peripheral wall portions including an intermediate section between the two end edges thereof, a spacing defined between each intermediate section and a respective coplanar pair of said bends.

2. The turnbuckle as claimed in claim 1, with each of the two coupling sections having an outer diameter smaller than that of the interconnecting section.

3. The turnbuckle as claimed in claim 1, with the two peripheral wall portions being diametrically opposed.

4. The turnbuckle as claimed in claim 1, with the screw holes of the two coupling sections having opposite hands.

* * * * *